United States Patent
Bergmann et al.

(10) Patent No.: US 6,702,476 B2
(45) Date of Patent: Mar. 9, 2004

(54) OPTICAL FIBER DEVICE HAVING ATTACHMENT TO OPTICAL DEVICE PACKAGE

(75) Inventors: Ernest E. Bergmann, Fountain Hill, PA (US); Salvatore S. Cimorelli, East Greenville, PA (US); Russell A. Crook, Hellertown, PA (US); Stephen Kenneth Fairchild, Maxatawney, PA (US); Jeffrey W. Scott, Temple, PA (US)

(73) Assignees: Agere Systems Inc., Allentown, PA (US); Triquint Technology Holding Co., Hillsboro, OR (US)

( * ) Notice: Subject to any disclaimer, the term of this patent is extended or adjusted under 35 U.S.C. 154(b) by 0 days.

(21) Appl. No.: 10/137,645

(22) Filed: May 2, 2002

(65) Prior Publication Data

US 2003/0206700 A1 Nov. 6, 2003

(51) Int. Cl.[7] .................................................. G02B 6/38
(52) U.S. Cl. ............................................ 385/55; 385/80
(58) Field of Search ............................... 385/53–60, 63, 385/71, 72, 77, 78, 80

(56) References Cited

U.S. PATENT DOCUMENTS 4,208,092 A * 6/1980 Monaghan et al.
6,173,099 B1 * 1/2001 Kiernicki et al. ............. 385/78
6,474,876 B1 * 11/2002 Sikorski, Jr. .................. 385/55

* cited by examiner

Primary Examiner—Khiem Nguyen

(57) ABSTRACT

A fiber optic device and a method of assembling the fiber optic device to provide at least four degrees of adjustment for an optical beam transported between an optical fiber and bulk optics in an optical device package. At an opening in the wall of the optical processor package, a washer-like structure allows initially adjustable contact at a flat surface thereof and at a spherically curved surface thereof. One of the surfaces bears against the wall about the opening and the other surface bears against a contact feature of a connecting assembly, typically a pre-assembled collimator assembly, that holds a termination portion of the optical fiber. Translational adjustment is made at the flat surface and tilting adjustment is made at the curved surface before final attachment at both surfaces. The fiber optic device is thus aligned with the optical device package and, through that package, can be aligned with another connecting assembly that is initially fixed in place at another opening of the optical device package. Circumferential tapers are provided at appropriate ones of the surfaces, the wall, and the contact feature to facilitate adhesive flow for final attachment.

20 Claims, 6 Drawing Sheets

OPTICAL FIBER DEVICE HAVING ATTACHMENT TO OPTICAL DEVICE PACKAGE

BACKGROUND OF THE INVENTION

1. Field of the Invention

This invention relates broadly to devices and methods for combining bulk optical devices with optical fiber transmission, and more specifically relates to an optical fiber device having an attachment to an optical device package with improved modes of adjustment, and relates to methods for its assembly.

2. Discussion of the Related Art

The use of bulk optical devices in the midst of optical fiber transmission requires the interconversion of approximately collimated optical beams with fiber-optic transport. This interconversion employs a connecting assembly usually involving the use of collimators that have to be accurately aligned to the collimated beam path and then fixed into permanent position as part of the device packaging process. Typically, the connecting assembly is a pre-assembled assembly including a fiber termination, with one or more fiber ends, and a lens that is positioned and fixed relative to the fiber termination prior to attachment to the device package, so that an optical beam of approximately constant cross-section, a collimated beam, can be optically coupled to or from the fiber.

The tutorial FIG. 1 shows variations in how a collimated beam can emerge from an optical device package through a hole 12 in the package wall 11. The beam may pass through at different places and at different angles. Specifically, beam #3 passes through the hole highest, and beam #2 lowest. Beam #1 is nearly orthogonal to the wall 11, but beam #3 is tilted downward the most. Such variations can easily occur due to variation in optical parts and variation in placements of the internal optics and/or the other pre-assembled collimator assemblies, located at other openings (not shown) of the optical device package.

In placing a pre-assembled collimator assembly (hereinafter, PCA) near to the wall to couple well to each of these three illustrated beams, we need to place the PCA at the right position (height, and depth into the paper) and with a suitable tilt to match that of the actual beam. For a coordinate system, let the z-axis be orthogonal to the package wall, approximately parallel to the beam direction. Let the x-axis be perpendicular to the plane of the paper, and the y-axis in the plane of the paper, pointing up. Small angular tilts can be described as small rotations about the x-, y-, and z-axes respectively.

Although the complete specification of the orientation of a solid in space takes six parameters (for six degrees of freedom), the placement of a collimator to couple well to the beam is not very sensitive to displacement along the z-axis, nor to rotation about the z-axis in the absence of polarization sensitivity. Thus, the main concern is for the other four degrees of freedom and the corresponding four parameters to control.

Tutorial FIG. 2 shows the relative insensitivity of loss to axial displacement, that is, translational displacement along the z-axis. Moving up to three centimeters in z results in a loss of 0.06 dB, less than two percent loss. The specific curve 21 in FIG. 2 is for a beam at 980 nanometers (nm), which has been expanded conventionally in cross-section to an approximate diameter of 0.4 mm to reduce the effects of diffraction within the interior optics of an optical device package, of which the package wall is wall 11 in FIG. 1.

Tutorial FIG. 3 shows in curve 31 that for a translation of the collimator in x or y, lateral motion, movement of 0.1 mm, 100 micrometers, from optimum causes a loss of about one dB, or about 20 percent loss. The specific curve 31 is also for a conventionally expanded beam of approximately 0.4 mm diameter at 980 nm.

In curve 41 tutorial FIG. 4 shows for lateral beam tilts a sensitivity that is considered relatively great. Lateral beam tilts are angular tilts of the beam about the x-direction or the y-direction. A tilt of less than three minutes of arc from optimum will result in a loss of about one dB. The specific curve 41 is also for a conventionally expanded beam of approximately 0.4 mm diameter at 980 nm.

In summary, axial displacement, displacement in z, needs control only by accurate manufacture of the package to its optical design, but for the four sensitive parameters, greater precision is needed.

SUMMARY OF THE INVENTION

According to the invention, a connecting assembly has a contact feature that contacts a first surface of a washer-like structure, and a second surface of the washer-like structure contacts the wall around the opening in the wall of the optical device package. The first and second surfaces are shaped differently and, preferably, each provides at least two directions of adjustment by relative motion of the contacting surfaces, prior to attachment.

According to the method of the invention, the washer-like structure is moved on its area of contact with the wall, and the connecting assembly contact feature and the washer-like structure are moved relatively on their area of contact until both the washer-like structure and the connecting assembly are centered on the beam path.

According to a feature of the invention, attachment is then made at both surfaces of contact.

Various features and advantages of the invention may be appreciated from its several implementations and as practiced according to the teaching of the following detailed description, taken together with the drawings.

DETAILED DESCRIPTION

Figure 1:
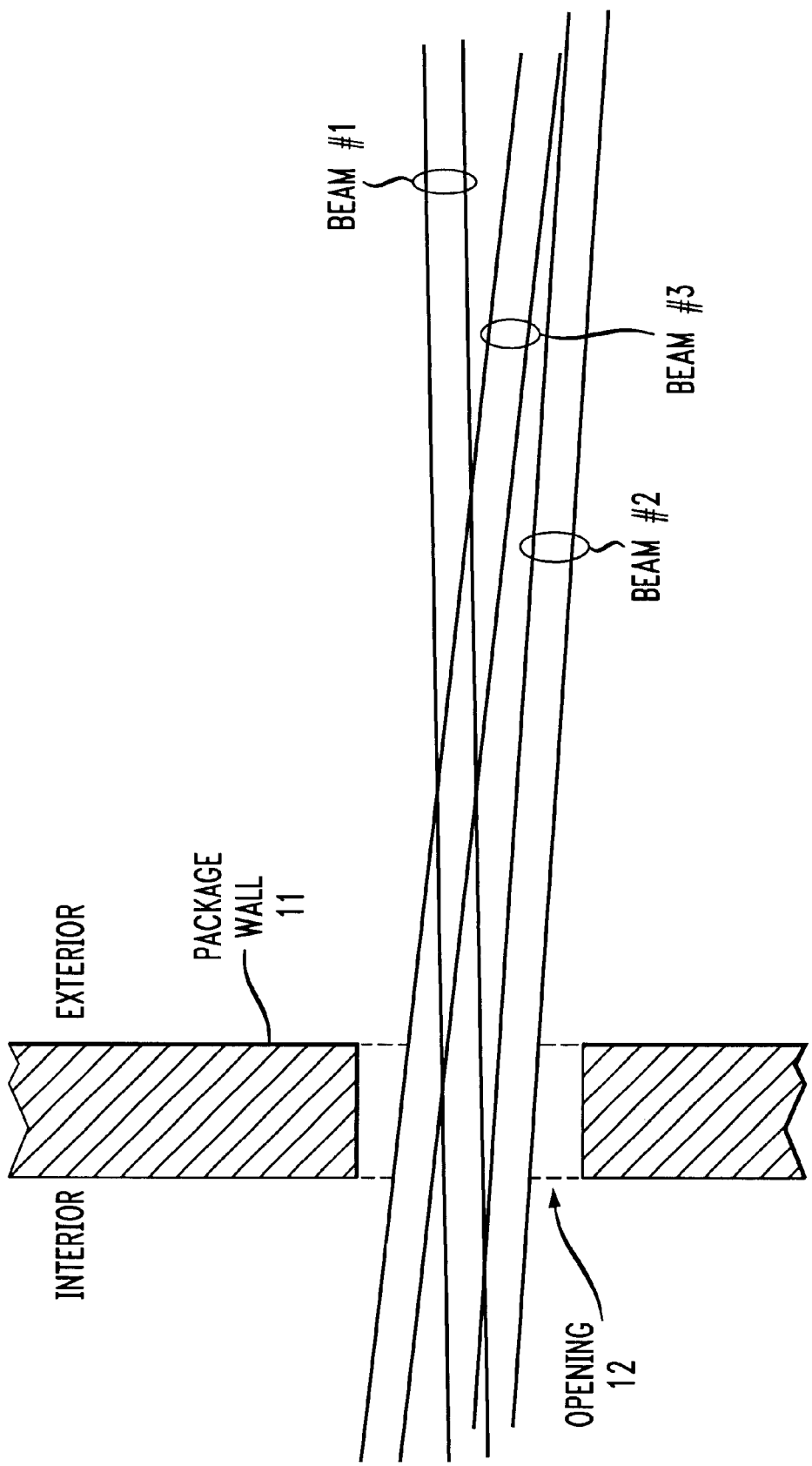
FIG. 1 is a cross-sectional view of an optical processing package wall with possible collimated beams passing through an opening therein.
Figure 2:
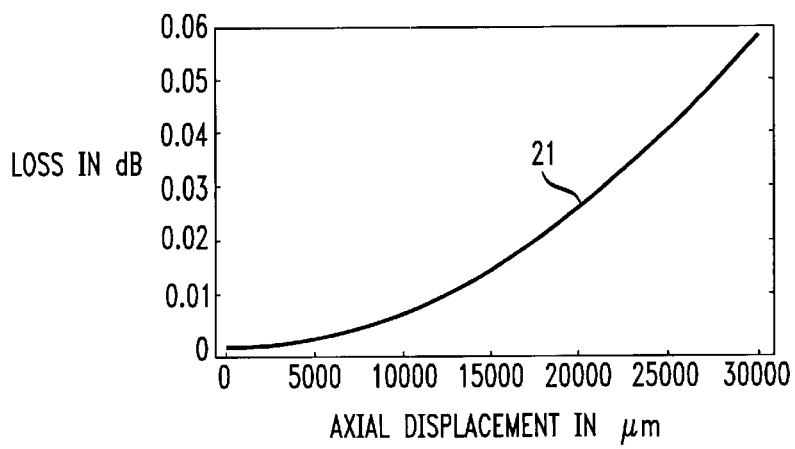
FIG. 2 is a theoretical plot of coupling loss versus z-displacement.
Figure 3:
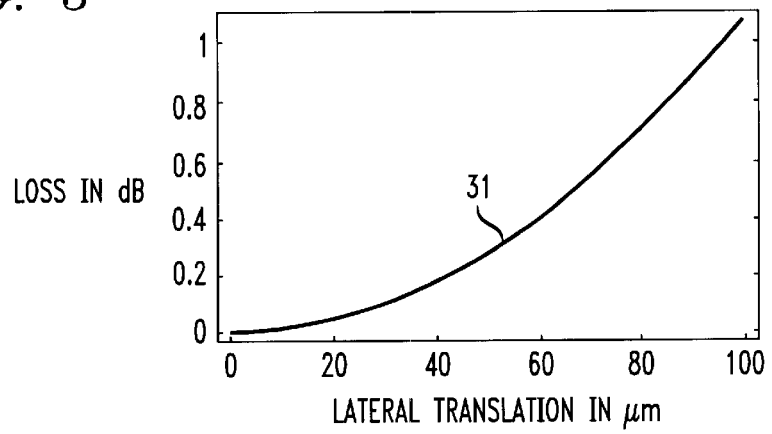
FIG. 3 is a theoretical plot of coupling loss versus lateral displacement.
Figure 4:
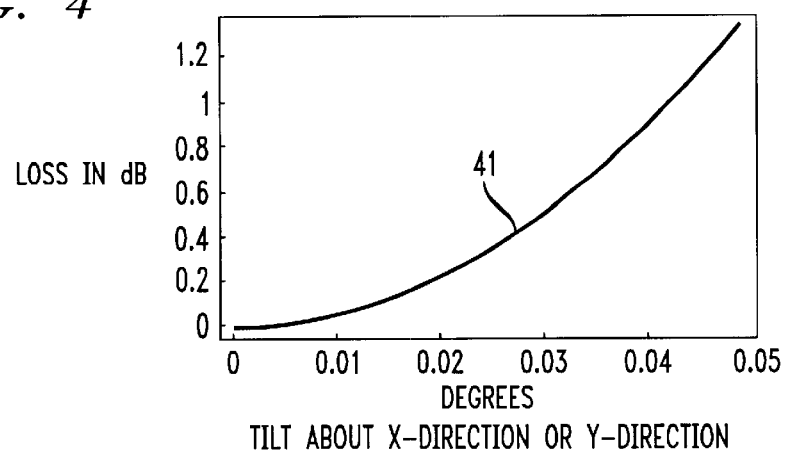
FIG. 4 is a theoretical plot of coupling loss versus lateral tilt.

The following background information will enable a more precise understanding of the invention.

An optical device package connected to one or more fibers of a fiber optic system may typically involve propagation of a free space beam. The package may or may not involve conversion to a baseband signal and reconversion to an optical beam. The interior optical piece parts may include, but are not limited to, coated slabs such as filters, prisms, isolator sub-assemblies, and laser and photodiode optical subassemblies.

The optical device package will have package walls that contain the optical devices used to manipulate the beam. The walls of interest for the present invention will have one or more holes through which light can pass. Preferred wall geometries are cylindrical and box-like.

Immediately after leaving the PCA (the pre-assembled collimator assembly) the beam is a free-space beam with approximately constant cross-section. If it is described as a bundle of ray paths, the ray paths are drawn mutually parallel. As light is a wave phenomenon, diffraction effects play a role and prevent an actual optical beam from maintaining exactly a constant cross-section. A practical result of diffraction is that the optical coupling between two collimators does depend somewhat on their separation. The larger the initial cross-section of a collimated beam, the slighter the effects of diffraction.

In general, the present invention makes use of four degrees of freedom, by which is meant the ability to change the orientation of a PCA so that it can be translated lateral to the beam direction, that is, in the x, y plane, and so that it can be tilted about the x and y directions. An optional fifth degree of freedom may be useful to rotate the PCA relative to an optical polarization by rotation about the optical axis, the z-axis.

The present invention also makes use of bearing surfaces, which are pairs of surfaces that provide a means of sliding constraint between two parts. In the preferred embodiments, the sliding constraints used are planar and spherical. Planar constraint provides two degrees of freedom of adjustment by lateral translation, and spherical constraint provides two degrees of freedom of adjustment by tilting. Either provides a third degree of freedom corresponding to rotation about the direction of the optical beam. Following adjustment, attachment can take place between the bearing surfaces.

Attachment is the process of fixing the orientation of two parts together in a more or less permanent manner. Common and preferred methods are the use of adhesive, with light (e.g., ultra-violet (uv)) curing, heat curing and/or chemical reaction, or the use of solder, or welding, either resistance welding or laser-induced welding. An important aspect of attachment is the lack of uncontrolled movement, which would spoil alignment. Another important aspect is the lack of movement in response to environmental changes.

The preferred embodiments use a highly-filled adhesive material. Highly filled adhesives reduce adhesive swelling, most cure shifts due to cure shrinkage, and thermal displacements due to temperature changes or cycling. Specific examples are Optocast® 3410, Optocast® 3415 and Optocast® 3417, available from Electronic Materials Inc. in Breckinridge, Colo. These materials can use brief ultraviolet exposure for initial tacking, followed by longer thermal curing once sufficient material has been flowed into one or more adhesive channels that are provided.

For applications where thixotropic adhesives are not practical, use of cationic, unfilled non-polar adhesives (e.g., cycloaliphatic epoxy functionalized siloxanes) can significantly reduce moisture-induced swelling and improve damp heat performance of the attachment. Further, for glass or metal surfaces, proper cleaning and adhesion promotion are desirable. Silane adhesion promoters are effective. For plastic injection-molded surfaces, oxygen plasma cleaning or uv ozone cleaning are effective.

It has further been found to be important to provide damp heat durability of the adhesion by pre-treating the surfaces to be adhered with an adhesion promoter such as gamma glycidoxypropyltrimethoxysilane, or any one of many other adhesion promoters.

A particular feature of the present invention involves the use of a washer-like structure, which is a mechanical element that has a hole through which passes any or all of the following: (1) the free space beam, (2) the PCA, and (3) the fiber pigtail. The washer-like structure has two bearing surfaces that respectively mate with the package wall and with a contact feature of the PCA. These two bearing surfaces are preferably respectively flat and spherically curved, with the center of curvature of the latter approximately centered upon some portion of the free space beam in the body of the optical device package.

Cooperative with the washer-like structure is the PCA contact feature. Somewhere on the PCA out of the path of the beam, there is a bearing surface that will be in contact with one of the two bearing surfaces of the washer-like structure. This is the PCA contact feature. It may be part of the surface of one or more optical parts or fiber termination portion, or it may be a piece part that is added to the PCA.

Figure 5:
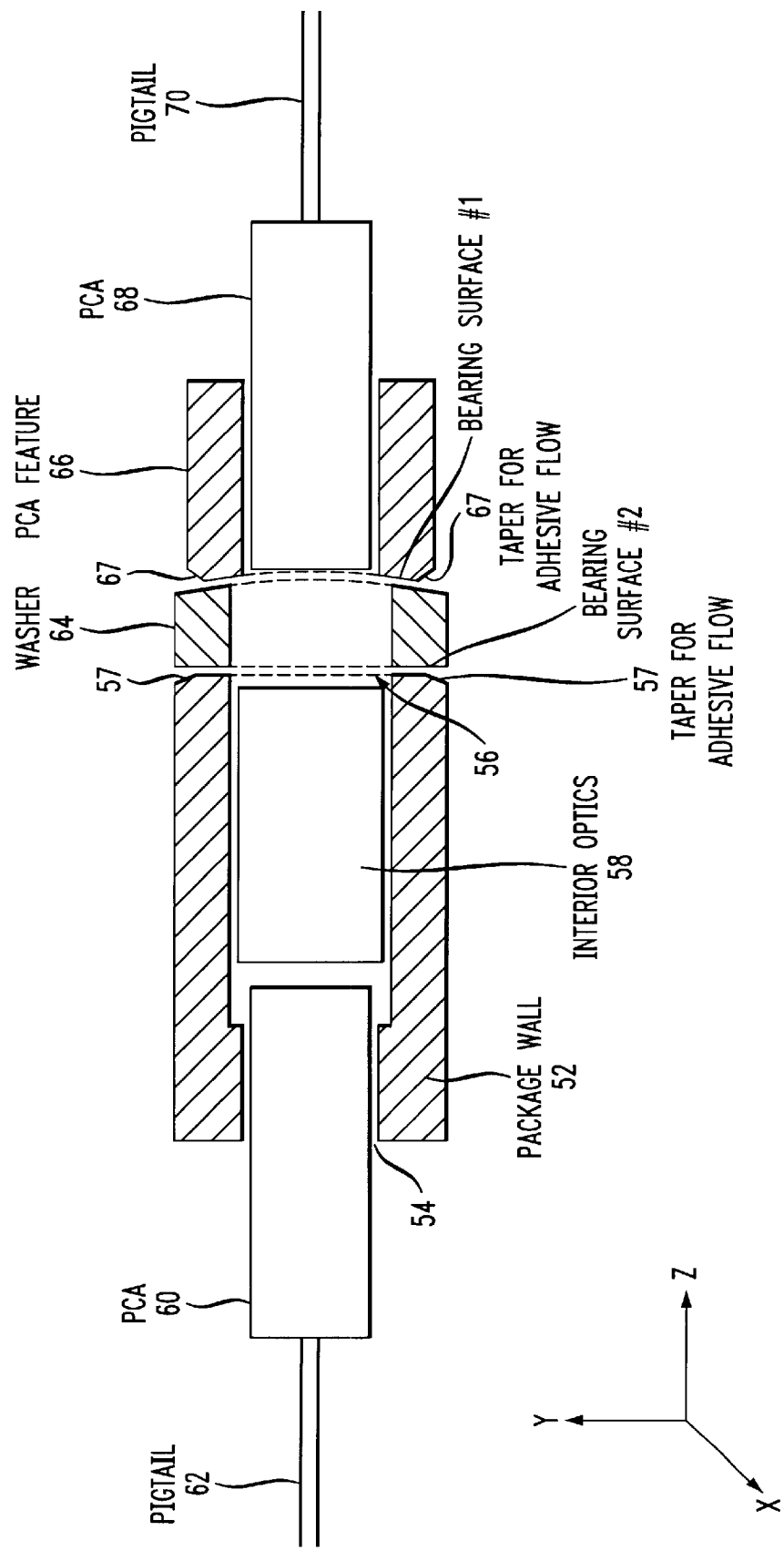
FIG. 5 is a cross-sectional view of a first embodiment of the invention.

In FIG. 5, a first embodiment of the invention is implemented in an optical fiber device including an optical device package, illustratively between two sections of optical fiber.

More specifically, a fiber optic device is provided with four or more degrees of freedom of adjustment according to the invention. The device includes a cylindrical optical device package 51, including a package wall 52, end openings 54 and 56, and interior optics 58. Inserted into opening 54 is a PCA 60 of known type with its pigtail 62, a termination portion of an optical fiber. At the other end, on the portion of package wall 52 surrounding opening 56 is disposed washer-like structure 64 with its flat bearing surface #2 in sliding contact with the correspondingly flat end wall. Its spherically-curved bearing surface #1 is in sliding contact with the correspondingly spherically-curved bearing surface of the PCA contact feature 66 of PCA 68.

The spherically curved bearing surface of the PCA contact feature 66 is provided with an initial circumferential taper 67 to facilitate adhesive flow between the contacting bearing surfaces. The centers of curvature of these spherically curved surfaces lie on the intended beam path within optical device package 51. The initial taper 67 does not provide a significant deviation from spherical curvature for the contacting surface of PCA feature 66. PCA 68 can be essentially identical to PCA 60. Likewise, its pigtail 70 can be like pigtail 62.

The flat bearing surface end wall of package wall 52 is provided with circumferential taper 57 to facilitate adhesive flow. Alternatively, it could be provided in flat bearing surface #2 of washer 64. Alternatively, one or more radially-extending grooves (not shown), instead of the tapers shown, could be used in one or more of the contacting bearing surfaces #1 or #2.

The fiber optic device of FIG. 5 is tested by powering one of the pigtails and measuring the power transferred to the other pigtail. Optimizing the transverse alignment is achieved by sliding washer-like structure 64 at bearing surface #2; and optimizing the angular alignment is achieved by sliding PCA contact feature 66 at bearing surface #1.

Then the parts are squeezed together, the alignment re-checked, and only thereafter is attachment completed, as described in more detail in the initial portion of this detailed description, by flowing in the adhesive, uv-tacking the parts and then heating curing the adhesive. The alignment process needs to be active as described because of minor variations in the fabrication of the parts and because of variations in the assembly process.

Figure 6:
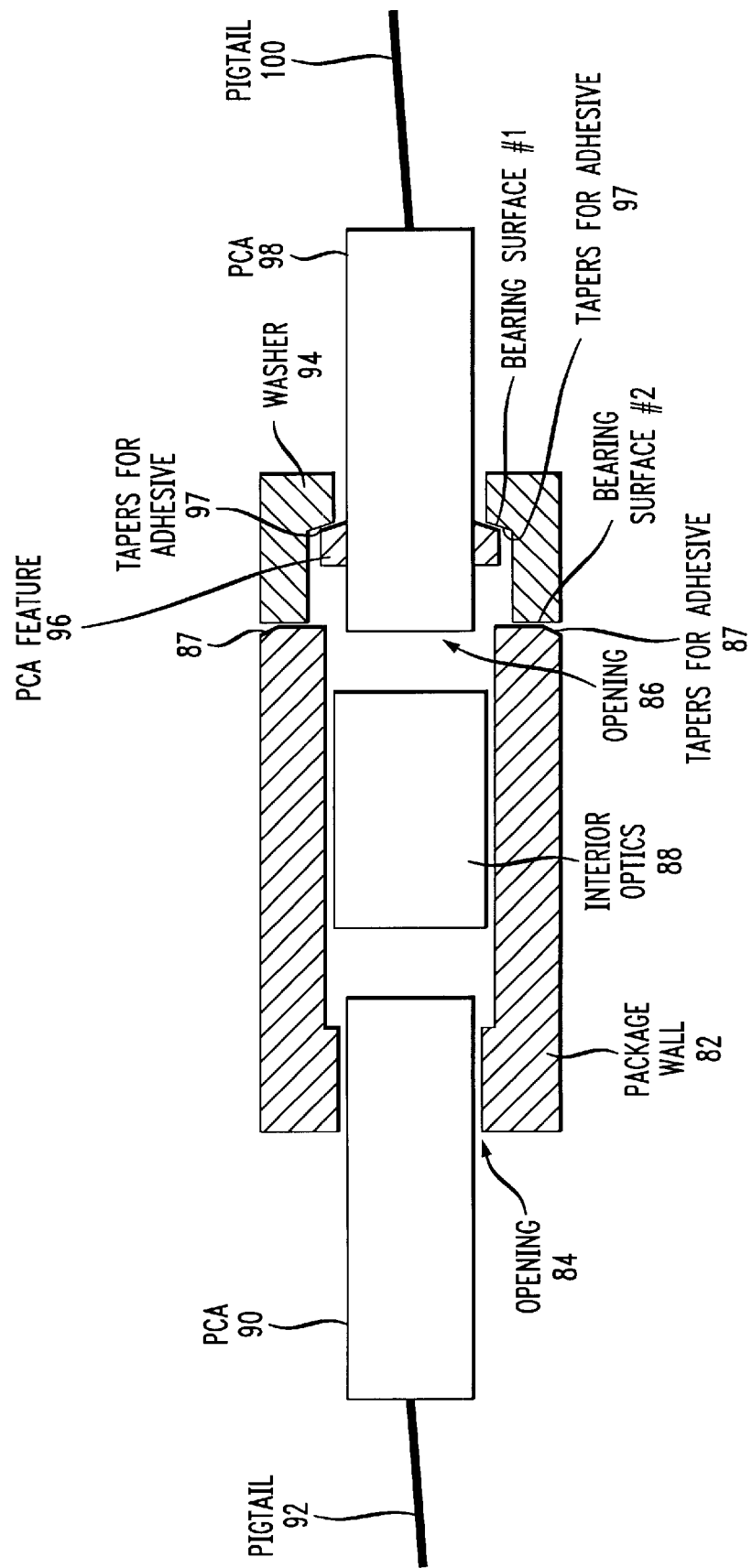
FIG. 6 is a cross-sectional view of a second embodiment of the invention.

Like that of FIG. 5, the fiber optic device of FIG. 6 is provided with at least four degrees of freedom of adjustment according to the invention. The device includes a cylindrical optical processing package 81, including a package wall 82, end openings 84 and 86, and interior optics 88. Inserted into opening 84 is a PCA 90 of known type. PCA 90 includes pigtail 92, which is a termination of the optical fiber. The PCA is assembled with the lens portion in fixed relation to the pigtail 92. The body of the PCA is formed with the lens, the pigtail, and a sleeve or sheath around everything optical in the PCA. At the other end of the device, on the portion of package wall 82 surrounding opening 86 is disposed washer-like structure 94 with its flat bearing surface #2 in sliding contact with the correspondingly flat end wall. Taper 87 is illustratively provided in bearing surface #2 of package wall 82, although a taper could be provided, and a taper or grooves could be provided in the contacting flat surface of washer-like structure 94.

The spherically-curved bearing surface #1 of washer-like structure is in sliding contact with the correspondingly spherically-curved bearing surface of the PCA contact feature 96 of PCA 98. The centers of curvature of these spherically-curved surfaces lie on the intended beam path within optical processing package 81. Because PCA contact feature 96 is a separate piece part from PCA 98, the latter can be essentially identical to PCA 90. Likewise, its pigtail 100 can be like pigtail 92. Spherically-curved bearing surface #1 of PCA contact feature 96 has initial circumferential taper 97 to facilitate adhesive flow, although a taper or grooves could also be provided in the spherically-curved surface of washer-like structure 94.

The fiber optic device of FIG. 6 is tested by optically powering one of the pigtails 92, 100 and measuring the optical power transferred to the other pigtail. Optimizing the transverse alignment is achieved by sliding washer-like structure 94 at bearing surface #2; and optimizing the angular alignment is achieved by sliding PCA contact feature 96 at bearing surface #1. Then the contacting surfaces are squeezed together as described above for the implementation of FIG. 5, the alignment is re-checked, and only thereafter is attachment completed. Access for depositing the adhesive is facilitated by making package wall 82 in two or more parts that join along lines parallel to the optical axis.

Figure 7:
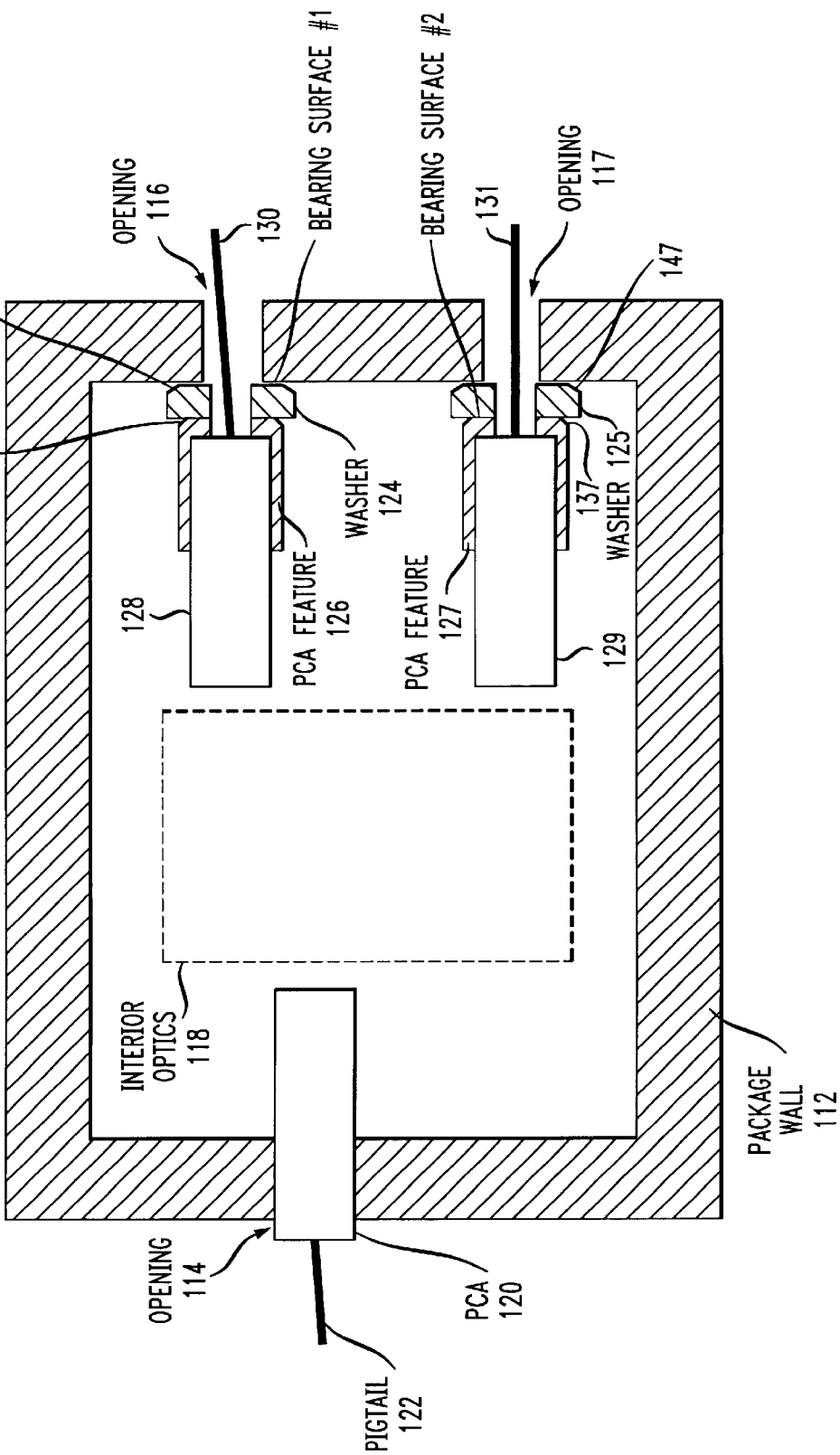
FIG. 7 is a cross-sectional view of a third embodiment of the invention.

Unlike FIGS. 5 and 6, FIG. 7 shows two adjustable ports. Like those of FIGS. 5 and 6, the fiber optic device of FIG. 7 is provided at each of its two adjustable ports at openings 116 and 117 with at least four degrees of freedom of adjustment according to the invention. The device includes a box-like optical device package 111, including a package wall 112, end openings 114, 116, and 117, and interior optics 118. Inserted into opening 114 is a PCA 120 of known type with its pigtail 122, a termination portion of an optical fiber. These parts may all be the same or similar to the parts of FIG. 6 numbered 30 digits lower.

At the other end of the device, on the interior portions of package wall 112 surrounding openings 116 and 117, are disposed washer-like structures 124 and 125 with their flat bearing surfaces, in this case designated with #1, in sliding contact with the correspondingly flat end wall. Their spherically curved bearing surfaces #2 are in sliding contact with the correspondingly spherically curved bearing surfaces of the PCA contact features 126 and 127 on PCA 128 and PCA 129 respectively. The centers of curvature of these spherically curved surfaces lie on the respective intended beam paths within optical processing package 111.

At both of ports 116 and 117 the flat bearing surfaces #2 of washer-like structures 124 and 125 face right against interior portions of package wall 112 and the spherically-curved bearing surfaces #1 of washer-like structures 124 and 125 face left, and the contacting spherically-curved bearing surfaces of PCA contact features 126 and 127 face right. In this implementation, package wall 112 is preferably bathtub-shaped, that is, an open box. One can reach into the interior to place interior optics 118, washer-like structures 124 and 125, PCA contact features 126 and 127, PCA 128 and PCA 129, and any other desired components. Lateral and angular alignment at both adjustable ports is performed and attachment is then achieved. Compression is brought to bear on bearing surfaces #1 and #2 at each port by moving PCA 128 and PCA 129 to the right against respective washer-like structures 124 and 125. Alignment is checked and then adhesive is placed at both sets of initial circumferential tapers 137 and 147 at the respective bearing surfaces and subsequently uv-tacked. Heat curing is subsequently performed. Optionally, a lid is placed on package wall 112 to close it.

Alignment is checked as in the other implementations. The fiber optic device of FIG. 7 is tested by powering, for example, pigtail 122 and measuring the power transferred to each of the other pigtails 130 and 131. Optimizing the transverse alignments is achieved by sliding washer-like Structures 124 and 125 at bearing surfaces #1; and optimizing the angular alignments is achieved by sliding PCA contact features 126 and 127 at bearing surfaces #2. Then the parts are squeezed together, the alignment is re-checked, and only thereafter is attachment completed.

Figure 8:
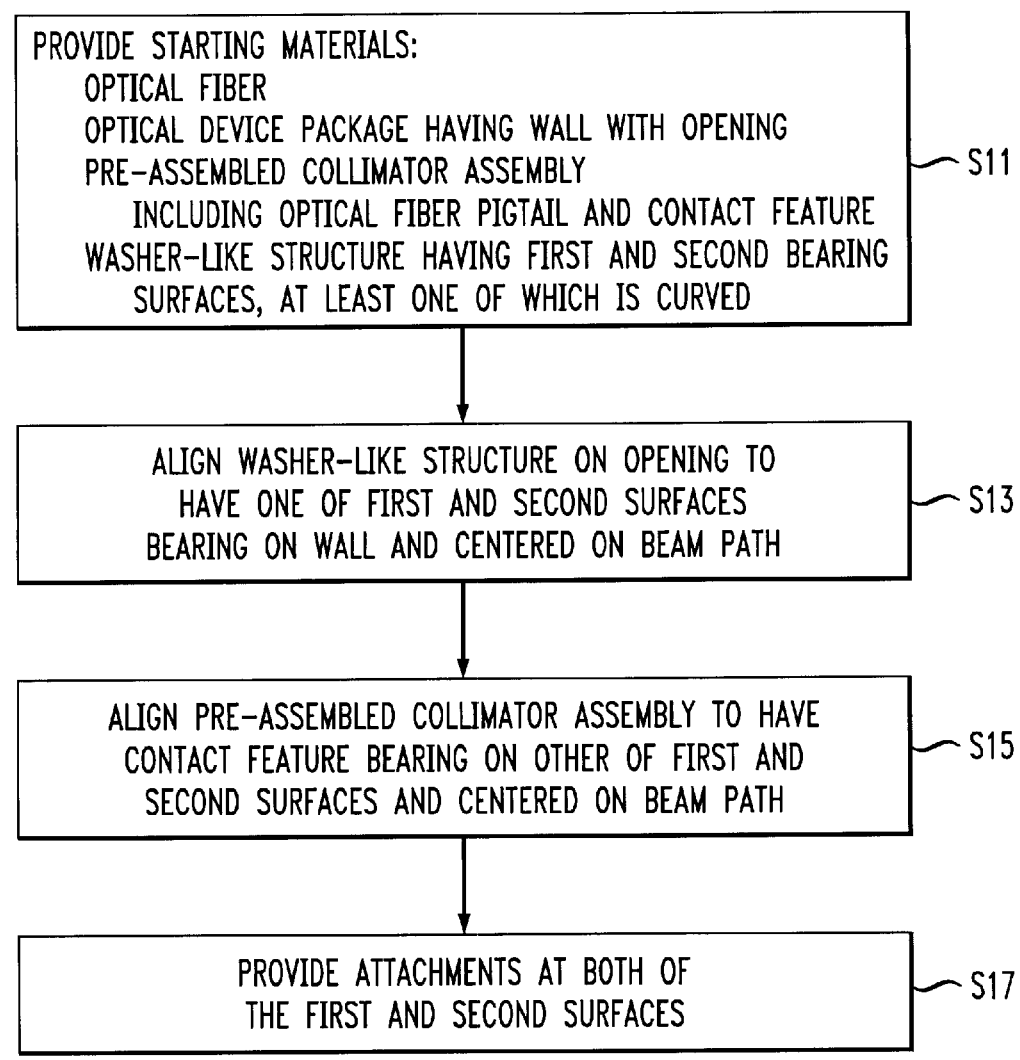
FIG. 8 is a flow diagram of the basic method of the invention.

In FIG. 8, a flow chart of the basic method of the invention is set out. The following starting materials are provided in step S11: an optical fiber; an optical device package having a wall with at least one opening; a pre-assembled collimator assembly including a termination portion (pigtail) of the optical fiber and having a contact feature; and a washer-like structure having first and second bearing surfaces, at least one of which is curved.

Step S13 provides that one aligns the washer-like structure on the opening to have one of the first and second surfaces bearing on the wall and centered on the beam path.

Step S15 provides that one aligns the pre-assembled collimator assembly to have its contact feature bearing on the other of the first and second surfaces and centered on the beam path.

Steps S13 and S15 can also be done in the reverse order.

S17 is the finishing step. After squeezing the bearing surfaces together and re-checking the alignment, one provides attachment at both of the first and second surfaces.

It should be understood that the techniques and arrangements of the present invention could be varied significantly without departing from the principles of the invention as explained above and claimed hereinafter. For example, while it is preferred that the optical processing package wall be cylindrical or box-like, it is feasible to provide a spherically-curved bearing surface around an opening in the package wall to bear on a spherically-curved bearing surface of the washer-like structure. While it is preferred that the other bearing surface of the washer-like structure be flat, both of its bearing surfaces can be curved, typically spherically curved, if the washer-like structure is sufficiently elongated along the optical axis. That is, if the two bearing surfaces of the washer-like structure are sufficiently separated along the optical axis, a tilt at one of the surfaces effectively provides translation at the other of the surfaces.

Further, while each of the preferred implementations of the invention has been described as employing a pre-assembled collimator assembly, it should be understood that other connecting assemblies could be employed. Also, rotation of the connecting assembly around the z-axis is generally available, providing three degrees of adjustment for each pair of adjustable contacting surfaces.

What is claimed is:

1. A fiber optic device comprising:
    an optical fiber;
    an optical device package having a wall with an opening in the wall;
    at least one connecting assembly including a termination portion of the optical fiber and having a contact feature; and
    a washer-like structure having a first surface contacting the wall around the opening in a first area of contact and having a second surface contacting the contact feature of the connecting assembly in a second area of contact, each of the first and second surfaces being configured to provide at least two degrees of adjustment by motion relative to the wall and the contact feature respectively.

2. The fiber optic device according to claim 1, wherein one of the wall and the first surface has a taper adjoining the first area of contact for admitting an adhesive to the first area of contact, and one of the contact feature and the second surface has a taper adjoining the second area of contact for admitting an adhesive to the second area of contact.

3. The fiber optic device according to claim 1, wherein the first area of contact is on an exterior portion of the wall of the optical device package surrounding the opening.

4. The fiber optic device according to claim 3, wherein the second area of contact is on an exterior portion of the washer-like structure axially separated from said first area of contact.

5. The fiber optic device according to claim 3, wherein the second area of contact is on an interior portion of the washer-like structure axially separated from said first area of contact.

6. The fiber optic device according to claim 1, wherein the first area of contact is on an interior portion of the wall of the optical device package surrounding the opening.

7. The fiber optic device according to claim 1, wherein the at least one connecting assembly comprises at least one pre-assembled collimator assembly including the termination portion of the optical fiber and having the contact feature.

8. The fiber optic device according to claim 2, wherein the at least one connecting assembly comprises at least one pre-assembled collimator assembly including the termination portion of the optical fiber and having the contact feature.

9. The fiber optic device according to claim 1, wherein the optical device package has a second opening, the fiber optic device further including a second optical fiber, further including a second connecting assembly occupying the second opening and including a terminal portion of the second optical fiber, and further including a second washer-like structure having a third surface contacting the wall around the second opening in a third area of contact and having a fourth surface contacting the contact feature of the second connecting assembly in a fourth area of contact, one of the third and fourth surfaces being configured to provide two directions of adjustment by translation, and the other of the third and fourth surfaces being configured to provide two directions of adjustment by tilting.

10. The fiber optic device according to claim 1, wherein one of the wall and the third surface having a taper adjoining the third area of contact for admitting an adhesive to the third area of contact, and one of the second contact feature and the fourth surface having a taper adjoining the fourth area of contact for admitting an adhesive to the fourth area of contact.

11. A method of assembling a fiber optic device, comprising the steps of:
    providing starting materials including an optical fiber, an optical device package having a wall with an opening in the wall through which light can pass to the optical device package, a connecting assembly including a termination portion of the optical fiber and having a contact feature, and a washer-like structure having a first and second bearing surfaces at least one of which is curved;
    aligning the washer-like structure to encompass the opening in the wall of the optical processing package and to have one of the first and second surfaces bearing on the wall and adjustable for coupling the connecting assembly with the optical device package;
    aligning the connecting assembly to have its contact feature bearing on the other of the first and second surfaces of the washer-like structure and adjustable for coupling the connecting assembly with the optical device package;
    making alignment adjustments at the first and second surfaces; and
    providing attachments at both of the first and second surfaces after making alignment adjustments.

12. The method according to claim 11, further including the steps of providing tapers in selected ones of the wall, the connecting assembly, and the washer-like structure to admit adhesive where each selected one bears on another, and depositing an adhesive in said tapers.

13. The method according to claim 12, wherein the first aligning step includes contacting the one surface of the first and second surfaces against an exterior portion of the wall, the second aligning step includes contacting the contact feature of the connecting assembly against the other surface of the first and second surfaces, and the step of making alignment adjustments includes tilting the curved one of the first and second surfaces to improve the coupling of the connecting assembly with the optical device package.

14. The method according to claim 12, wherein the other surface of the first and second surfaces is an interior surface of the washer-like structure axially separated from the one surface, and the second aligning step includes contacting the contact feature of the connecting assembly against the other surface.

15. The method according to claim 12, wherein the first aligning step includes contacting the one surface of the first and second surfaces against an interior portion of the wall, the second aligning step includes contacting the contact feature of the connecting assembly against the other surface of the first and second surfaces, and the step of making alignment adjustments includes tilting the curved one of the first and second surfaces to improve the coupling of the connecting assembly with the optical device package.

16. The method according to claim 12, wherein the step of depositing an adhesive in said tapers comprises depositing a highly-filled adhesive.

17. The method according to claim 16, wherein the step of depositing an adhesive comprises depositing an adhesive that is both ultraviolet-responsive and heat-responsive.

18. The method according to claim 17, wherein the step of providing attachments comprises exposing the adhesive to ultraviolet light to provide tacking and subjecting said adhesive subsequently to heat to provide curing.

19. The method according to claim 11, wherein the step of providing starting materials includes providing a pre-assembled collimator assembly as the connecting assembly.

20. The method according to claim 12, wherein the step of providing starting materials includes providing a pre-assembled collimator assembly as the connecting assembly.

* * * * *